Figure 1:
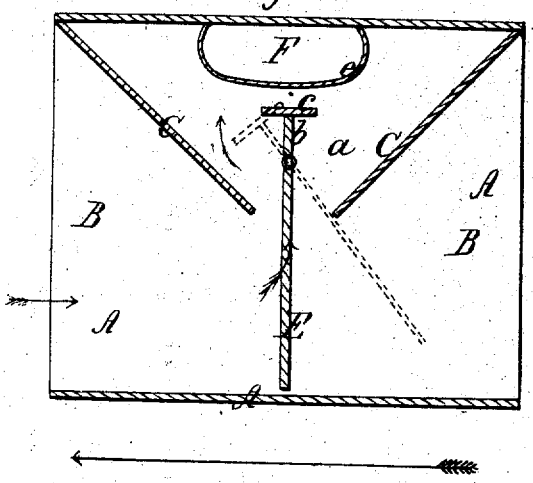
Figure 2:
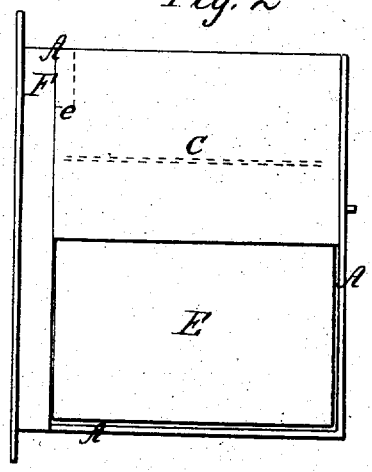

R. Hitchcock,

Car Ventilator.

No. 3,910. Reissued Apr. 12, 1870.

Witnesses

Edward H. Hyde

R. F. Nizal

Inventor

Robert Hitchcock

United States Patent Office.

HENRY D. CARROLL, ROBERT HITCHCOCK, AND JOHN H. HARE, OF SPRINGFIELD, MASSACHUSETTS, ASSIGNEES OF ROBERT HITCHCOCK.

*Letters Patent No.* 67,877, *dated August* 20, 1867; *reissue No.* 3,910, *dated April* 12, 1870.

RAILROAD-CAR VENTILATOR.

The Schedule referred to in these Letters Patent and making part of the same

I, ROBERT HITCHCOCK, of Springfield, Hampden county, Commonwealth of Massachusetts, have invented certain new and useful Improvements in "Car-Ventilators;" of which the following is a specification.

In the drawings—

Figure I is a side section of my invention, and

Figure II a front view of the same.

My invention consists in forming a car-ventilator so arranged that cinders and dust will not penetrate into the car while the current of fresh air is being forced through, but be warded off from the ventilator-openings, and either caught by the same or allowed to pass on by.

In order to accomplish this I arrange my ventilating devices in such a manner as to form two currents of air, the one passing upward before entering the car, to take in fresh air, the other passing outward, carrying with it the cinders and dust.

I will now describe my ventilator, referring to the figures.

The case A is made with a single thickness of sheet metal or similar substance, and is formed so as to be placed on the side of the car, as shown in Fig. II. An opening at each end, the entire width of the case A at B B′, allows the air to enter at either side, according to the direction in which the car is moving.

A funnel-shaped opening is made at each end by the pieces C C′, which extend downwards, converging towards each other, but leaving a space, *a*, between their lower edges, between which is suspended a valve, E, the axis of which is a little above the horizontal line of the lower edges of the converging pieces C C′.

This valve E hangs down nearly to the bottom of the case, and extends upward above its axis a short distance at *b*, where the top is capped with a piece, *c*, projecting on both sides of the valve.

In the side next the car, in the top of the case A, is the opening F for the air to pass through into the car. This opening has a flange, *e*, projecting all around its edge, serving as an additional preventive to the passage of cinders.

The operation of this is as follows:

In Fig. I we will suppose the car going in the direction indicated by the arrow. In this case the valve is blown back, as shown by red lines, showing its top part forward. The air rushing through the opening B is divided into two currents, one forced up in front of the valve, following the course of the small arrows shown in the figure, while the other carries out the cinders, and other heavy foreign matter, between the lower edge of the valve and the bottom of the case.

Should any by accident get above the valve, their weight causes them to fall back rather than follow the upward current into the car.

By this means I obtain a very simple and useful invention, and one that can be cheaply constructed.

Various small alterations in proportions and construction may be made to suit summer and winter use, without affecting the principle and operation.

What I claim is—

Forming in a car-ventilator two currents, one current being turned upward before entering the car, and the other passing outward, in the manner and for the means herein described and explained.

R. HITCHCOCK.

Witnesses:

J. B. GARDINER,

R. F. HYDE.